(No Model.)
G. O. RINMAN.
PIPE JOINT.
No. 432,248. Patented July 15, 1890.
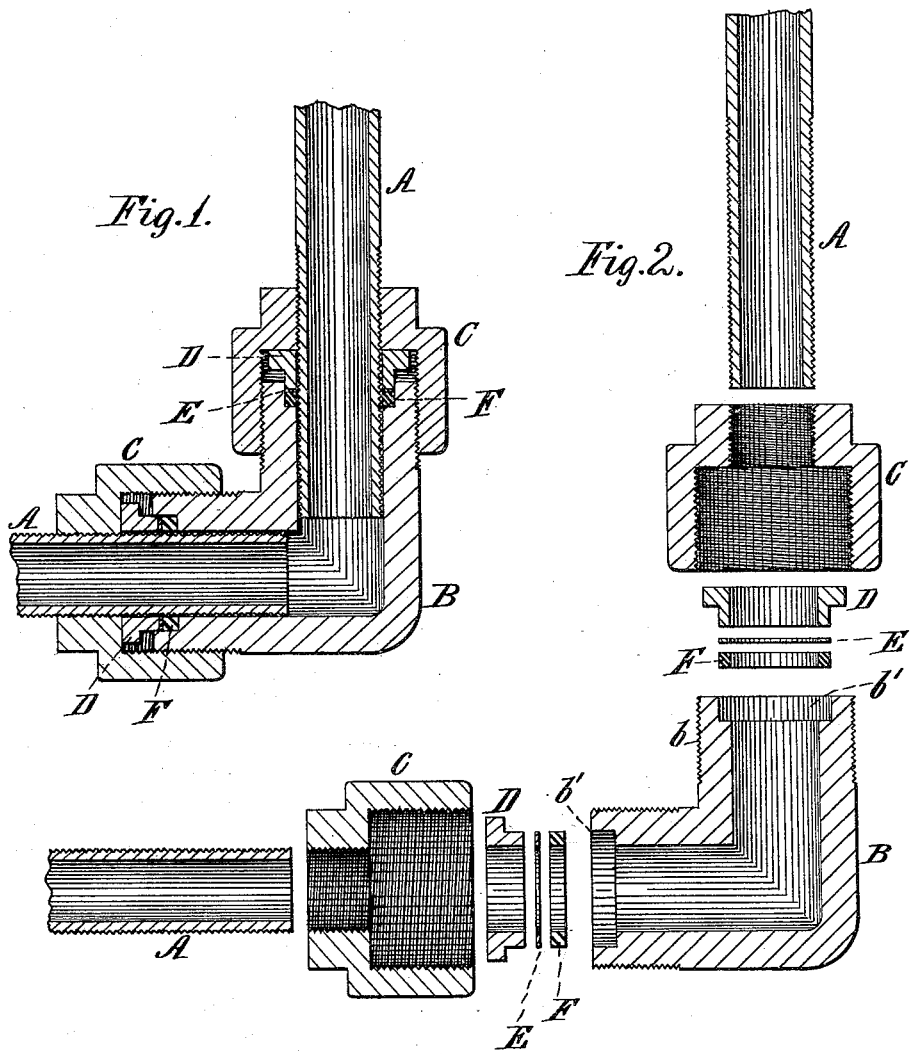
Witnesses:
W. C. Jirdinston.
August F. Herbsleb.
Inventor:
Gustave O. Rinman

UNITED STATES PATENT OFFICE.

GUSTAVE O. RINMAN, OF CINCINNATI, OHIO, ASSIGNOR TO THE CINCINNATI ICE MACHINE COMPANY, OF SAME PLACE.

PIPE-JOINT.

SPECIFICATION forming part of Letters Patent No. 432,248, dated July 15, 1890.

Application filed October 23, 1889. Serial No. 327,920. (No model.)

*To all whom it may concern:*

Be it known that I, GUSTAVE O. RINMAN, a citizen of the United States, residing at Cincinnati, in the county of Hamilton and State of Ohio, have invented a certain new and useful Improvement in Pipe-Joints, of which the following is a specification.

My invention consists in a pipe-joint of novel construction, in which the fluids passing through the pipe are kept from contact with the locking parts of the joints.

In the drawings, Figure 1 is a longitudinal section showing two of my pipe-joints applied to an elbow-piece. Fig. 2 is a longitudinal section of the same, showing the parts separated.

A represents a pipe externally screw-threaded at the end to be coupled.

B is a pipe-connection having at one or both ends a male thread $b$ and an internal recess $b'$. I have illustrated the pipe-connection as an elbow; but it may be a sleeve, valve, flange, or any part to which it is desired to join a pipe.

C is a coupling-nut having two female threads of different diameters, one adapted to engage with the thread upon the pipe A, and the other adapted to engage with the thread $b$ upon the pipe-connection B.

D is a gland or follower, E a washer, and F an elastic packing-ring.

To join the pipes, the packing-ring F is placed in the recessed portion of the pipe-connection B. The pipe A is then passed through the coupling-nut C, gland D, washer E, and packing-ring F, with its end projecting into the pipe-connection B. The coupling-nut is then screwed down, forcing the gland and washer against the packing-ring and expanding the latter, so that it closely embraces the pipe A and prevents the passage of any liquid to the holding portion of its thread. The packing-ring is also closely pressed against the bottom and wall of the recess, thereby preventing the passage of the liquid to the thread by which the pipe-coupling B is joined to the coupling-nut C. When the gland or follower is made separate from the coupling-nut, the washer may be omitted; but would be found highly advantageous, if not absolutely essential, should the coupling-nut and gland be made integral.

It is obvious that any packing susceptible of being spread by pressure and of being thus made to completely fill the space between pipe A and connection B will serve the purposes of the packing-ring F; hence I do not mean to restrict myself to a packing-ring of rubber or other strictly-elastic material, but contemplate the use of lead and like substances.

I claim—

1. In combination with a pipe-connection provided with an internal ledge or shoulder, a yielding packing-ring seated against said ledge or shoulder, a follower bearing against said packing-ring, an externally-threaded pipe passing freely through the follower and the packing-ring and into the opening of the pipe-connection, and a coupling-nut having two internally-threaded portions of different diameters, one fitting the threads of the pipe and the other fitting external threads upon the pipe-connection.

2. In combination with an externally-threaded pipe-connection provided with an internal ledge or shoulder, a yielding packing-ring seated against said ledge or shoulder, an externally-threaded pipe passing freely through the packing-ring and into the unthreaded interior of the connection, and a coupling-nut having two internally-threaded necks, one screwing upon the external thread of the connection and the other screwed upon the external thread of the pipe.

3. In combination with externally-threaded connection B, provided with recess B', externally-threaded pipe A, extending into said connection, packing-ring F, seated in said recess, washer E, bearing against said packing-ring, gland or follower D, bearing against said washer, and coupling-nut C, screwed upon pipe A and upon connection B, substantially as and for the purpose set forth.

GUSTAVE O. RINMAN.

Witnesses:
GEORGE E. HEISEL,
AUGUST F. HERBSLEB.